Figure 8:
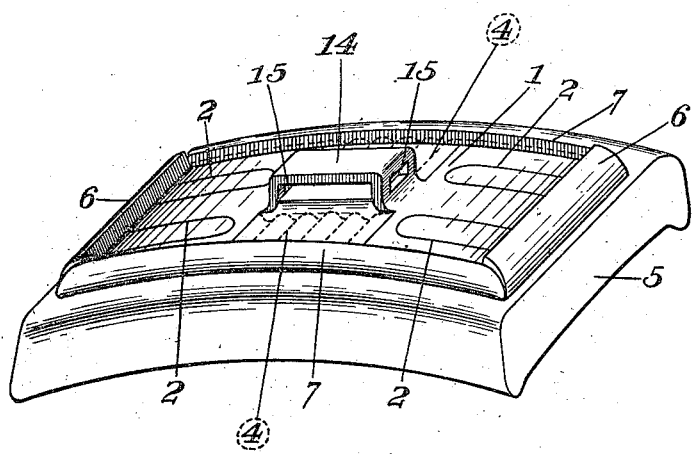

J. J. MORSE & W. S. GEMMER.
BRAKE SHOE.
APPLICATION FILED NOV. 9, 1911.
1,031,658.
Patented July 2, 1912.
3 SHEETS—SHEET 1.
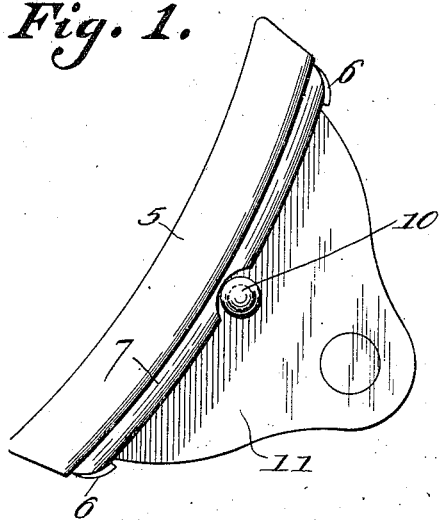
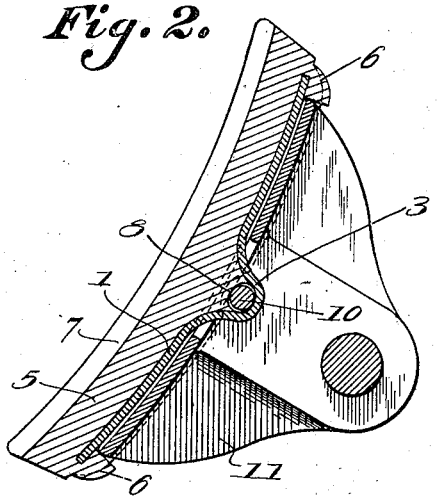
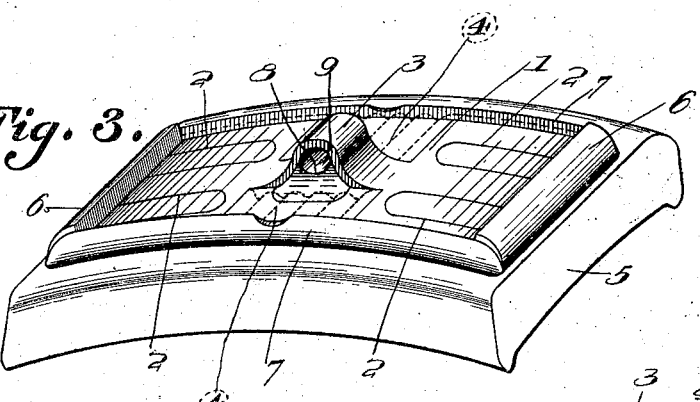
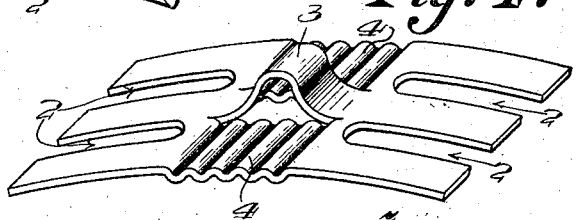
Witnesses:
Bertha von Behrens.
Lottie M. Fox.
Inventors:
John J. Morse
Walter S. Gemmer
By Hugh K. Wagner
Their Attorney.

J. J. MORSE & W. S. GEMMER.
BRAKE SHOE.
APPLICATION FILED NOV. 9, 1911.
1,031,658.
Patented July 2, 1912.
3 SHEETS—SHEET 2.
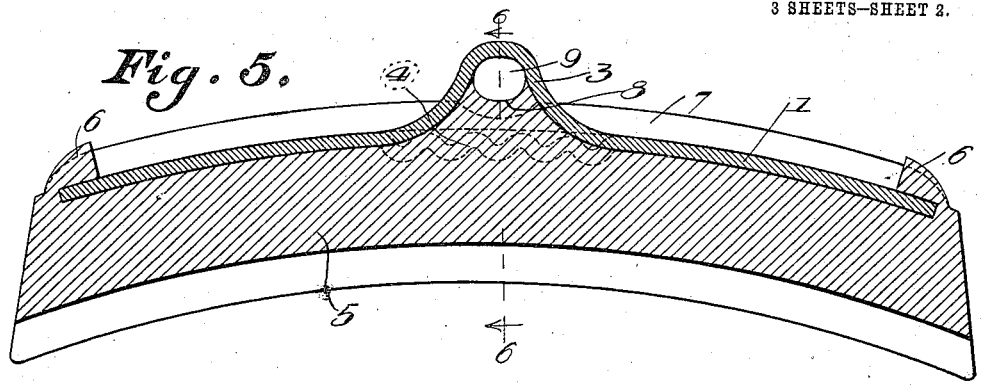
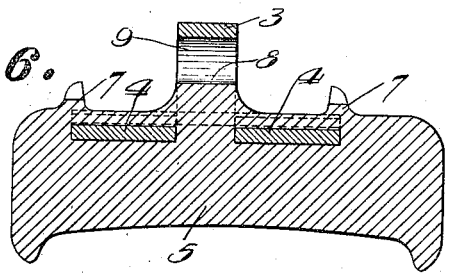
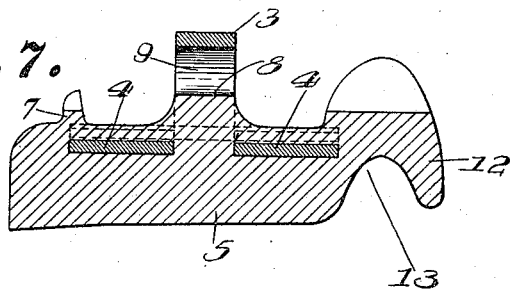

UNITED STATES PATENT OFFICE.

JOHN J. MORSE AND WALTER S. GEMMER, OF ST. LOUIS, MISSOURI.

BRAKE-SHOE.

1,031,658.

Specification of Letters Patent.

Patented July 2, 1912.

Application filed November 9, 1911. Serial No. 659,274.

*To all whom it may concern:*

Be it known that we, JOHN J. MORSE and WALTER S. GEMMER, citizens of the United States, residing at the city of St. Louis, State of Missouri, have invented certain new and useful Improvements in Brake-Shoes, of which the following is a specification, reference being had therein to the accompanying drawings.

This invention pertains to certain new and useful improvements in brake shoes, and the objects of the invention are to provide an improved structure in which a minimum number of parts is utilized; to unite the parts to obtain a connection of maximum strength and efficiency; to reinforce the structure at points subjected to the greatest strain; and to increase the longevity of the same.

In the drawings: Figure 1 is a side elevation of a brake shoe constructed in accordance with the present invention; Fig. 2 is a longitudinal sectional view of Fig. 1; Fig. 3 is a perspective view; Fig. 4 is a perspective view of the steel back; Fig. 5 is an enlarged longitudinal sectional view of the shoe detached from the brake head; Fig. 6 is a section taken on the line 6—6 of Fig. 5; Fig. 7 is a similar view of a modified form of shoe adapted for use on flanged car-wheels; and Fig. 8 is a perspective view of a brake shoe reinforced with an alternate form of steel back.

The invention includes a steel back 1 preferably formed of a drop steel forging having the form depicted in Fig. 4 of the drawings, in which a series of longitudinal slots or openings 2 extend from the ends of the back inwardly toward the center thereof. The central part of the back, which extends between the inner ends of the slots or openings 2, is formed with an integral arched or looped portion 3 that occupies a position central of the space between the opposite longitudinal sides of the back. The arched or looped portion 3 may be formed by providing a pair of spaced longitudinal slits in the back plate and striking or forcing out the metal between said slits. The sides of the back at the central portions thereof are roughened preferably by transversely corrugating the back or forming folds therein to provide irregular surfaces 4, the purpose of which is to increase the metal cross-section, thereby imparting maximum strength to those points of the steel back which are subjected to severe strain. The corrugated portions 4 are preferably arranged to lie slightly below the outer face of the steel back 1, for a purpose later set forth.

The steel back 1 is placed in a mold and the shoe 5 is cast of iron or other suitable material so that the steel back forms a reinforcement for the back of the shoe as clearly depicted in Figs. 3, 5, 6 and 7 of the drawings. The shoe 5 is cast to have end ribs 6 and side ribs 7, the end ribs 6 covering or overlying the ends of the steel back 1, and the side ribs 7 covering or overlying the longitudinal sides of the steel back. A portion of the shoe is molded so as to extend into the interior of the arched or looped portion 3 and to abut the inner faces of the end portions of the arched or looped portion 3 for the purpose of acting as supports for the latter, bracing the same in an obvious manner. The outer face of that portion of the shoe 5 which projects in the arched or looped portion 3 is formed with a concave seat 8, providing in conjunction with the outer portion of the arched or looped portion 3 an eye 9 through which the pin 10 that couples the brake shoe to the brake head 11 passes. By disposing the corrugated portions 4 below the surface of the steel back, the iron or other material of which the shoe 5 is cast covers the corrugations as depicted in Figs. 3 and 5 of the drawings. Obviously the end ribs 6 and the side-ribs 7 assist in holding the steel back in place, though if desired the side ribs may be completely omitted.

An important advantage derived by the present invention is the effective securement of the steel back to the shoe at points central of the length of the former and also at the ends thereof. The effectiveness of the union between said parts occurring at the center thereof is enhanced by the presence of the roughened portions which not only afford a firm gripping surface for the cast-iron of which the shoe is formed, but also materially strengthen the parts due to the increased cross section provided by the corrugated or irregular surfaces. Further, by the construction of the arched or looped portion 3 maximum strength thereof is afforded, since the latter is of integral form devoid of any cut-out portions.

In Fig. 7 the shoe 5 is formed with an overhanging part 12 having a concave part 13, which is for engagement with the flanges of flanged car-wheels.

In Fig. 8, the central part of the steel back 1 is struck out to form an inverted U-shaped lug 14 in lieu of the arched portion 3, and each end of said lug is provided with an opening 15 in order to allow a key (not shown) to pass therethrough for the purpose of securing the shoe to a brake head in the usual manner.

What is claimed is:—

1. In a brake shoe, a back plate having a central arched portion and a depressed portion on each side of the arched portion, and a shoe proper in which each depressed portion is completely embedded, the major portions of the end parts of the back plate extending over the top face of the shoe proper in exposed relation thereto.

2. In a brake shoe, a back plate having a central looped portion and a roughened portion on each side thereof extending from the sides of the looped portion to the longitudinal sides of the plate.

3. In a brake shoe, a back plate having a central looped portion and a series of transverse corrugations on each side thereof.

4. In a brake shoe, a back plate formed with spaced longitudinal slits, the metal between said slits being struck-out to form an arched part, and a shoe proper having a part thereof extending up into said arched part to engage the inner faces of the sides thereof.

5. In a brake shoe, a back plate formed with spaced longitudinal slits, the metal between said slits being struck-out to form an arched part, and a shoe proper having a part thereof extending up into said arched part to engage the inner faces of the sides thereof, the outer face of said part of the shoe proper that extends in said arched part having a concave seat to coöperate with the outer portion of the arched part to form an eye.

6. A back plate for brake shoes having its central portion formed with series of spaced folds and an arched portion in the space between the folds.

7. In a brake shoe, a back plate having an arched portion located between the longitudinal sides thereof, and a series of corrugations formed in said plate between the sides of said arched portion and each of the longitudinal sides of the plate.

8. In a brake shoe, a back plate having an arched portion located between the longitudinal sides thereof, and series of transverse corrugations formed in said plate between the sides of said arched portion and each of the longitudinal sides of the plate, each of said series of corrugations extending from end to end of the arched portion.

9. In a brake shoe, a back plate having an arched portion located between the sides and ends thereof, the sides of the plate opposite to the sides of the arched portion being corrugated and depressed, a shoe proper in which said depressed portions of the plate are completely embedded, the ends of the plate beyond said depressed portions having their outer faces projecting beyond the adjacent face of the shoe so as to be exposed, and end ribs carried by the shoe and overlying the extreme end portions of the plate ends.

10. In a brake shoe, a back plate having an arched portion located between the sides and ends thereof, the sides of the plate opposite to the sides of the arched portion being depressed, a shoe proper in which said depressed portions of the plate are completely embedded, the ends of the plate beyond said depressed portions having their outer faces projecting beyond the adjacent face of the shoe so as to be exposed, end ribs cast integral with the shoe and overlying the extreme end portions of the plate ends, and side ribs also cast integral with the shoe and overlying the extreme outer portions of the longitudinal sides of the shoe.

11. In a brake shoe, a back plate having an arched portion and formed with an opening at each end that extends through the edge thereof, said plate having a depressed portion on each side of the arched portion thereof, which depressed portions are located between the inner ends of said openings, and a shoe proper that overlies said depressed portions and fills said openings and extends flush with the outer faces of the plate ends.

12. In a brake shoe, a back plate having an arched portion and formed with an opening at each end that extends through the edge thereof, said plate having a depressed portion on each side of the arched portion thereof, which depressed portions are located between the inner ends of said openings, a shoe proper that overlies said depressed portions and fills said openings and extends flush with the outer faces of the plate ends, and end ribs on the shoe overlying the extreme end portions of the plate ends.

13. In a brake shoe, a back plate having a central looped portion and a corrugated and depressed portion on each side thereof, a shoe proper in which said depressed portions are completely embedded, the ends of the plate beyond the depressed portions projecting without the shoe, and end ribs on the shoe that overlie the outer faces of the plate ends.

In testimony whereof we hereunto affix our signatures in the presence of two witnesses.

JOHN J. MORSE.
WALTER S. GEMMER.

Witnesses:
   LOTTIE M. FOX,
   BERTHA VON BEHRENS.